(No Model.)

R. TAIT.
VALVE FOR WATER TANKS.

No. 451,394. Patented Apr. 28, 1891.

Witnesses
Wm. M. Rheem
Martin H. Olsen

Inventor
Richard Tait,
By Charles T. Brown,
Atty.

UNITED STATES PATENT OFFICE.

RICHARD TAIT, OF CHICAGO, ILLINOIS.

VALVE FOR WATER-TANKS.

SPECIFICATION forming part of Letters Patent No. 451,394, dated April 28, 1891.

Application filed December 15, 1890. Serial No. 374,782. (No model.)

*To all whom it may concern:*

Be it known that I, RICHARD TAIT, a subject of the Queen of Great Britain, residing at Chicago, in the county of Cook and State of Illinois, have invented certain new and useful Improvements in Valves for Water-Tanks, of which the following is a full and complete specification.

The invention relates to that class of valves for water-tanks wherein it is necessary when the water-tank is to be emptied to actuate the valve therefor by the pulling of a cord or chain, such valve remaining open until the water has all or nearly all run from the tank, when the valve is designed to automatically close, so that additional water flowing into the tank will be contained therein until the valve shall be again actuated. Valves of this character are usually placed in tanks used in connection with water-closets, the tank being of the right size to hold the amount of water required to properly flush the closet whenever the valve is opened; and the object of this invention is to economically construct a valve of the character named, which will be certain and positive in its movement and noiseless in its working, requiring no springs of any kind, as air, rubber, or metal, or a regulator of any kind, as air or rubber, the valve being actuated by a float and by gravity to close it when the designed amount of water has flowed from the tank; and, further, it is desired to produce a valve of this character which can readily be secured to the tank, so that no leakage shall occur at the joining of the valve with the tank.

A further object of this invention is to obviate the disagreeable noise connected with the emptying of a tank through a siphon, which noise is commonly known in the art as "snorting."

I have illustrated the invention by the drawings accompanying and forming a part of the specification, in which—

Figure 1:
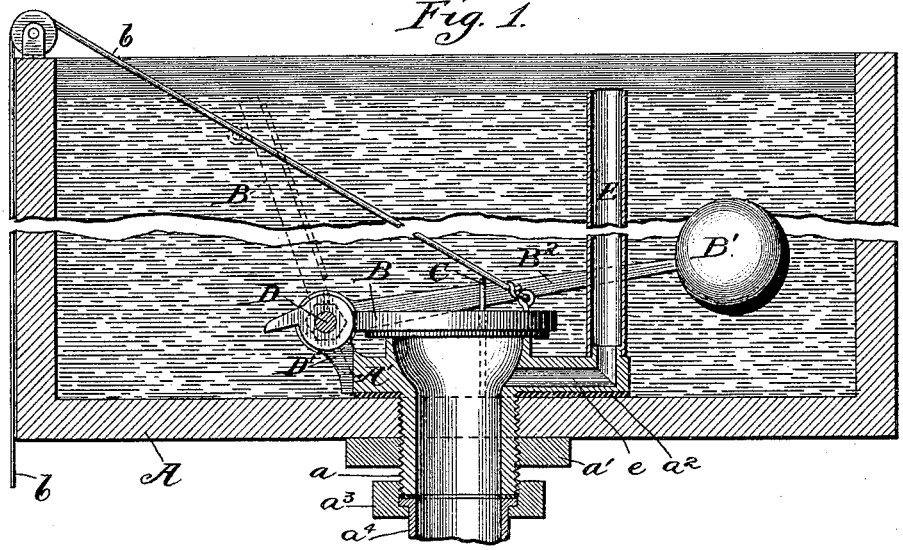
Figure 2:
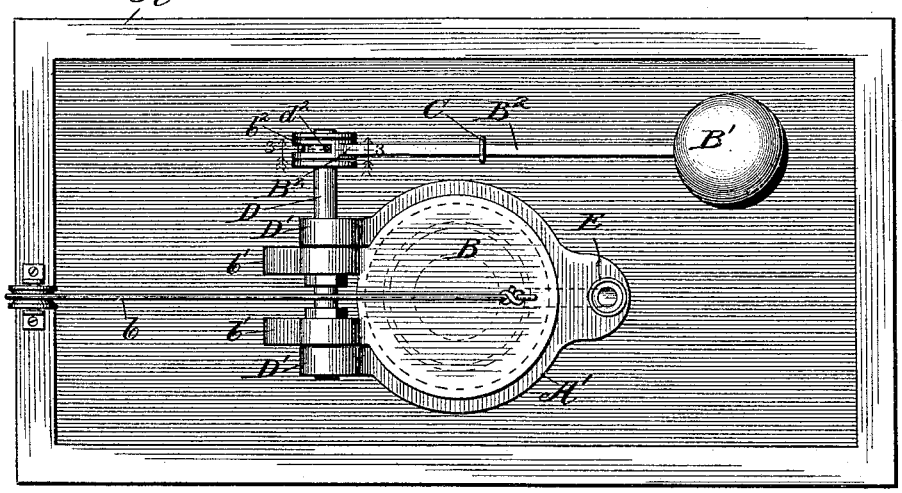
Figure 3:
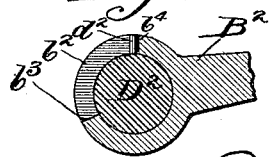

Figure 1 is a longitudinal sectional view of the tank, showing the valve in elevation, the pipe leading from the tank underneath the valve in section, and showing the waste-pipe of the tank and its manner of joining with the valve in section, and also showing by dotted lines the position of the valve when opened; Fig. 2, a plan view of the inside of the tank with the valve closed, but with no water therein; and Fig. 3, a sectional view on line 3 3 of Fig. 2, viewed in the direction of the arrows, illustrating the manner in which the float-ball and arm thereof is connected to the valve so as to properly actuate it in the closing thereof.

Like letters refer to similar parts throughout the several views.

A is a tank.

A' is a valve-seat having neck $a$, which extends through a hole in the bottom of tank A. The neck $a$ is threaded and has thereon nut $a'$.

$a^2$ is a ring of sheet-rubber, which is ordinarily interposed between the bottom of the valve-seat A' and the tank A in placing the valve in the tank, after which the nut $a'$ is turned firmly against the under side of the bottom of the tank A.

$a^3$ is a cap, which has a screw-thread on the inside thereof fitting to the screw-thread on the neck $a$ of the valve-seat A', and $a^4$ is the upper end of the outlet-pipe, through which the water flows from the tank A to the closet fixture or other receptacle receiving the water from the tank when the valve is opened.

B is a valve.

$b'$ are projections or lugs on valve B, through which projections the shaft D passes and to which such shaft is rigidly secured. These projections $b'$ also serve as stops, limiting the upward and backward movement of the valve B in the opening thereof, such stops coming in contact with the rear edge of the valve-seat A' when the valve is fully opened.

B' is a float-ball, and $B^2$ is the arm, to one end of which it is secured.

C is a stop limiting the upward movement of the float-ball B' and arm $B^2$. The shaft D rotates freely in the bearings D'. That end of the shaft D to which is pivoted the arm $B^2$ has an enlarged head $D^2$, which may be cast integral therewith, or may consist of a ring rigidly secured to the shaft D. The arm $B^2$ has a ring at the pivotal end thereof, and this ring fits over the enlarged head $D^2$ of the shaft D, turning freely on the head, or, in other words, allowing shaft D to turn freely without imparting movement to the arm $B^2$ by such turning.

$b^2$ is a slot in the pivotal end of arm $B^2$, and $d^2$ is a pin or bolt driven firmly into the head $D^2$ or cast integral therewith, as preferred, forming a stop. This slot $b^2$ is sufficiently long to permit the stop $d^2$ to travel from end to end thereof as valve B is opened fully. When water is contained in the tank A and the float-ball B' is at its extreme upward position, as illustrated in Fig. 1, the end $b^3$ of the slot $b^2$ is in position to permit the valve to assume the condition indicated by the dotted lines in Fig. 1, the pin $d^2$, when the valve is thus raised, coming near to but not necessarily in contact with this end $b^3$ of the slot. The valve being opened, the water flows from the tank, and as the surface of the water in the tank recedes below the height necessary to hold the float-ball B' in an elevated position the float-ball will of course move downward with the surface of the receding water. As the float-ball falls, carrying with it the arm $B^2$, the end $b^3$ of the groove $b^2$ will be brought against stop $d^2$, and such stop, together with the shaft D, will rotate with the rotation of the arm $B^2$. The float-ball B' is so arranged in reference to the movement of the valve B that such float-ball falls a sufficient distance to bring the valve B over a perpendicular line, so that it will by gravity fall forward the remainder of the distance and into the position illustrated in Figs. 1 and 2 by the full lines, thereby closing the valve. The extreme upward and backward movement of valve B is indicated by dotted lines in Fig. 1.

$b$ is a cord by which the valve B is actuated. The top of the valve-seat A' is of such height above the bottom of the tank in relation to the float-ball B' and its connection with the valve B that when the valve is brought forward of a perpendicular line by the movement of the float-ball B', as described, and allowed to drop into a closed position there is a stream of water flowing over the edges of the valve-seat through the valve and out of the tank, forming a cushion, upon which the valve B falls, thereby preventing noise or injury to the valve or valve-seat. There is enough of this water flowing out through the valve at the time of the dropping of the valve B, as described, to prevent the making of the noise liable to be made when water from any receptacle has fallen so low therein in running out therefrom as to permit air to enter the outlet-pipe along with the outflowing liquid.

E is the waste-pipe, the upper end of which controls the height of the water in the tank A'.

$e$ is the aperture in the valve-seat through which the water, if any, passing downwardly in the waste-water pipe E flows to the hole in the valve-seat underneath the valve B.

Having thus described my invention, what I claim as new, and desire to secure by Letters Patent of the United States, is—

In combination with a valve-seat, a valve rigidly secured to a shaft turning freely in journals, an arm loosely pivoted to such shaft, a float-ball at the outer end of such arm and a slot at the pivotal end thereof, and a stop rigidly secured to the rotatable shaft movable in such slot, whereby when the float-ball is at its extreme upward position and the valve is fully opened such valve passes beyond a perpendicular line and as the float-ball falls the valve is brought forward of such perpendicular line by the end of the slot striking the stop and into position to fall by gravity to a closed position, substantially as described.

RICHARD TAIT.

Witnesses:
CHARLES T. BROWN,
FLORA L. BROWN.